March 14, 1961    N. S. DI LORENZO    2,974,567
OPHTHALMIC MOUNTINGS
Filed Dec. 8, 1958    2 Sheets-Sheet 1
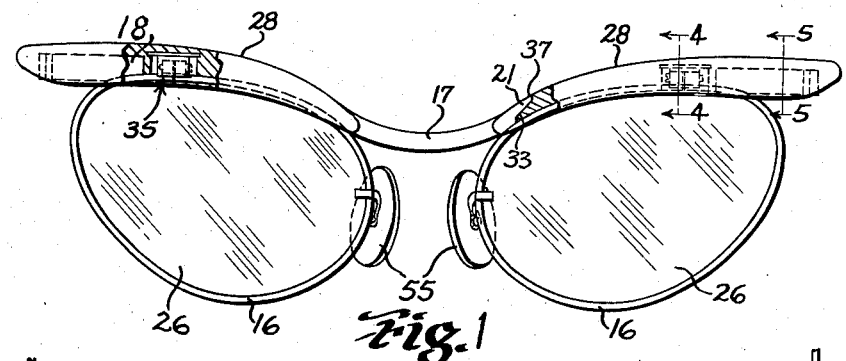
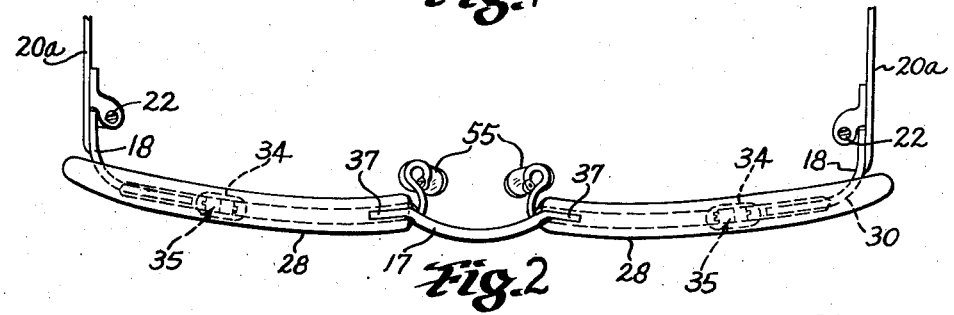
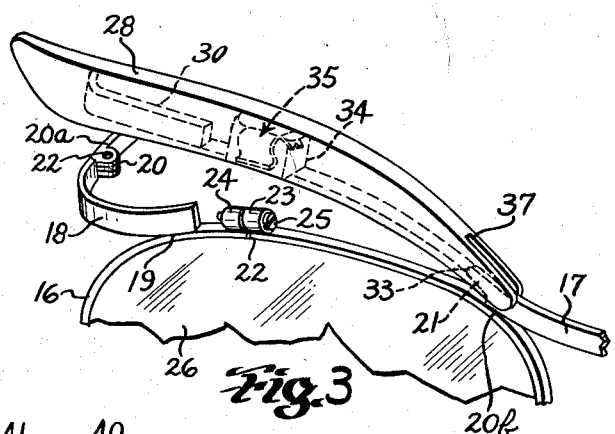
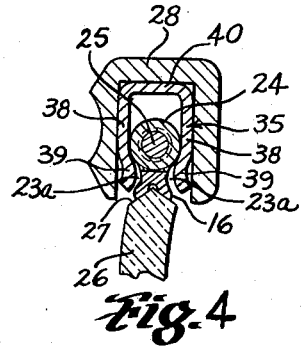
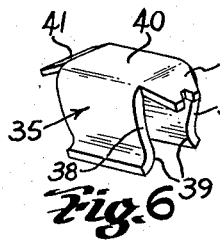
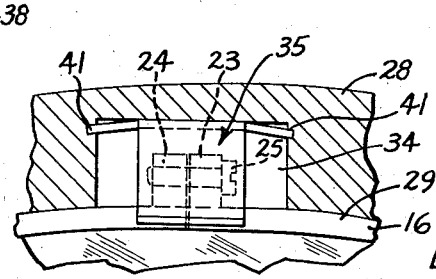
INVENTOR
NORMAN S. DiLORENZO
BY
Louis L. Gagnon
ATTORNEY March 14, 1961  N. S. DI LORENZO  2,974,567
OPHTHALMIC MOUNTINGS Filed Dec. 8, 1958  2 Sheets-Sheet 2

INVENTOR
NORMAN S. DiLORENZO
BY
Louis L. Gagnon
ATTORNEY

United States Patent Office 2,974,567
Patented Mar. 14, 1961

2,974,567
OPHTHALMIC MOUNTINGS

Norman S. Di Lorenzo, Southbridge, Mass., assignor to American Optical Company, Southbridge, Mass., a voluntary association of Massachusetts Filed Dec. 8, 1958, Ser. No. 778,860
4 Claims. (Cl. 88—41)

This invention relates to improvements in ophthalmic mountings and has particular reference to the provision of novel detachable trims for such mountings.

One of the principal objects of the invention is to provide detachable trims for use with a frame-type mounting of the type embodying metallic lens rims joined on the nasal sides thereof by a bridge member having undercut portions on the opposed ends thereof, the said rims being divided in their upper portions and having tubular-like lugs secured to the divided ends of the rims and adapted to be connected with each other by a screw or the like wherein each trim is provided on its nasal end with means to latch with an undercut portion of the bridge and intermediate its ends is provided with spring clamp means which may be snapped over and into connected relation with the tubular-like lugs to retain the trims on the mounting.

Another objects is to provide temple endpieces on the temporal sides of the rims having portions extending above the rims and adapted to fit within channels formed in the trims to further aid in retaining the trims in proper fitted and aligned relation with the rims of the mounting.

Another object is to provide novel means and method of forming the spring clamp means and of securing said clamp means to the trims.

Other objects and advantages of the invention will become apparent from the following description taken in connection with the accompanying drawing wherein:

Fig. 1 is a front elevational view of a mounting embodying the invention showing certain portions thereof in cross section;

Fig. 2 is a fragmentary top plan view of the mounting illustrated in Fig. 1;

Fig. 3 is a slightly enlarged fragmentary perspective view showing the relation of the trim and mounting just prior to snapping the trim in assembled relation with the lugs;

Fig. 4 is an enlarged fragmentary sectional view taken on line 4—4 of Fig. 1 and looking in the direction indicated by the arrows;

Fig. 5 is an enlarged sectional view taken as on line 5—5 of Fig. 1 and looking in the direction indicated by the arrows;

Fig. 6 is a perspective view of one form of clamp embodied in the invention;

Fig. 7 is a fragmentary sectional view illustrating how the clamp of Figure 6 is assembled with the trim;

Figure 15:
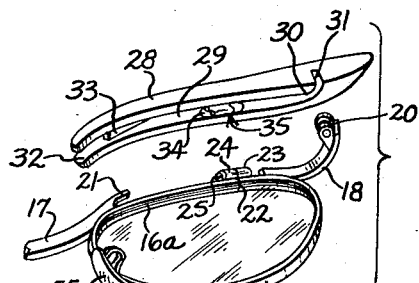
Fig. 15 is a fragmentary exploded perspective view showing the underside of the trim and rim of the mounting illustrated in Figs. 1 through 3.

Referring to the drawing wherein like characters of reference designate like parts throughout the several views, the mounting embodying the invention comprises a pair of metallic lens rims 16 each having an inner bevelled channel 16a extending circumferentially thereof and adapted to receive the bevelled edges 27 of the lenses 26. The lens rims 16 are connected on the nasal sides thereof by a bridge member 17 and have temple endpieces 18 secured to the temporal sides thereof. The temple endpieces are each formed of bent flat stock soldered or otherwise secured at one end thereof to the peripheral surface of the respective metallic lens rims, as illustrated at 19. The endpieces curve outwardly and rearwardly and terminate in perforated ears 20 to which a temple 20a is pivotally connected by a pivot pin, screw or other suitable pivot means 22. The bridge 17 is also formed of flat stock and is soldered adjacent its ends, as illustrated at 20b, to the peripheral surfaces of the nasal sides of the rims so as to extend above the rims and each end thereof is provided with an undercut portion 21 as illustrated in Figs. 1, 3 and 15. The respective lens rims 16 are each divided in the upper portions thereof, as illustrated at 22, and one of the divided ends is provided with a tubular lug 23 and the other with a similar tubular lug 24. The lug 24 is provided with a threaded bore adapted to receive a connecting screw 25 which is extended through the first lug 23 and is threaded into the bore of the lug 24.

With this arrangement, the lenses 26 may be inserted into the rims by first loosening the screws 25 to allow the divided ends to be spaced relative to each other an amount sufficient to permit the rims to receive the bevelled edges 27 of the lenses and the screws 25 are thereafter tightened to secure the lenses in the rims. It will be noted that the divided portions of the rims are at a location wherein the longitudinal axes of the connecting lugs and screws are disposed in a substantially horizontal direction, that is, their axes are disposed substantially normal to the direction of torsional or twisting strain which might be directed thereto when opening or closing the temples during the normal use of the mounting and thereby protect the lenses from such strain.

It is pointed out that the bridge 17 and endpieces 18 are secured to the rims in edgewise relation therewith so as to extend upwardly or outwardly thereof in the intermediate plane of said rims.

Detachable trims 28 which may be formed either of metal, plastic, or other non-metallic material as desired are provided, as shown best in Fig. 15, with a longitudinal channel 29 in the underside thereof adapted to receive the upper portions of the rims 16. The said trims 28 are each further provided in the temporal end thereof with a slot 30 communicating with the channel 29, which slot 30 is dimensioned and shaped to receive the intermediate portion of the endpiece 18. The rear end of the slot 30 opens outwardly, as illustrated at 31, in the rear of the trim so as to permit the end carrying the pivot lugs 20 to be free to pivotally receive the temple 20a. The nasal end of each trim 28 is bifurcated or slotted in communicating relation with the channel 29, as illustrated at 32, and is provided with a tongue 33 of a reduced thickness internally of and straddling the bifurcated end adapted to be positioned in an undercut end 21 of the bridge 17. The said trim is further provided with a recess 34 in the intermediate portion thereof which also communicates with the channel 29 and in which a suitable U-shaped spring clamp 35 is secured. The U-shaped spring clamp 35 is of such a cross-sectional shape and size as to permit its being intimately snapped over the connecting lugs 23 and 24 adjacent the divided ends 22 of the rim 16, as shown in cross-section in Fig. 4 whereby portions of the branches of said U-shaped clamp adjacent the free ends thereof will extend inwardly of channels 23a along the opposite sides of the tubular lugs and which result from attaching said lugs to the flat outer surface of the rim and the outer angled sides of the rim. The trim 28 is attached to the rim by first positioning the tongue 33 inwardly of the undercut end 21 of the bridge 17 and thereafter pressing the trim inwardly onto the rim to cause the spring clamp 35 to move into superimposed clamping relation with the lugs 23 and 24. During the snapping of the clamp 35 of a trim onto the lugs 23 and 24, the endpiece 18 will be simultaneously positioned internally of the slot 30 and the longitudinal channel portion 29 will move into overlying relation with the upper portion of the rim whereby the undercut end 21 of the bridge 17, the lugs 23 and 24, the upper portion of the rim, and the major portion of the endpiece 18 will be concealed from view by said trim. The upwardly extending ends of the bridge which fit within the bifurcated ends of the trims and the upwardly extending portions of the endpieces 18 which fit within the slots 30 in the trims further function to retain the trims against sidewise displacement either forwardly or rearwardly of the plane of the rims.

When it is desired to remove or interchange trims, all that is necessary is to exert a lifting action on the temple ends thereof to disengage the spring clamps 35 from the tubular lugs 23 and 24 whereby the tongues 33 on the nasal ends of the trims may be backed outwardly of the undercut ends 21 of the bridge. It is further pointed out that the nasal ends of the trims 28 are each provided with a recessed portion 37 above the tongue 33 into which the ends of the bridge above the undercut portions 21 thereof are adapted to fit when the trims are in position of use.

The spring clamps 35 of the above-described arrangement may be formed of beryllium copper, stainless steel or other suitable material and are preferably initially blanked from flat material to a shape which after bending will provide two spaced branches 38 having inwardly cupped end portions 39 adjacent the free edges thereof. The branches 38 are joined by an intermediate portion 40 having outwardly extending integral end portions 41 wherein the said clamp 35 will have a U-shaped cross-section with the ends 41 extending outwardly of the opposed sides of the branches. The said ends 41 are initially bent slightly downwardly toward the free ends of the branches. The clamp 35, when the trim 28 is formed of plastic material, as shown in Fig. 7, is adapted to be forced inwardly of the opening 34 so as to cause the free ends of the outwardly extending portions 41 to become slightly embedded within the material of the adjacent side walls of the opening 34 to thereby lock the clamp in assembled relation with the trim 28. The function of this arrangement is such that it permits the clamp 35, as shown in Fig. 4, to be sprung over the tubular lugs 23 and 24 to hold the trim in proper position on the frame with the free ends of the outwardly projecting portions 41 being adapted to bite into the plastic trim and to hold said clamp in said recess 34 when the trim is thereafter being removed from the frame by forcing the clamp free from the lugs 23 and 24.

Figure 8:
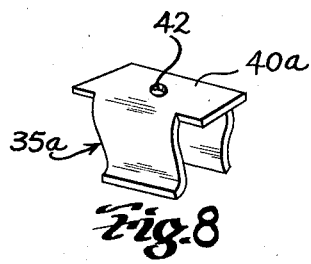
Fig. 8 is a view generally similar to Figure 6 of a modified type of clamp.
Figure 9:
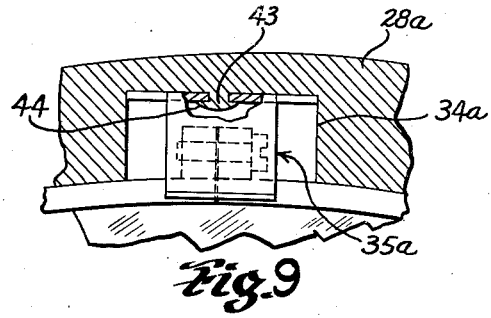
Fig. 9 is a view generally similar to Fig. 7 showing the clamp of Fig. 8 in assembled relation with the trim.

In Figures 8 and 9, there is shown a further modification of clamp 35a adapted particularly for use with a trim 28a formed of metal such as aluminum or the like. In this instance, the clamp is constructed generally similar to the clamp 35 with the exception that the intermediate portion 40a is provided with an opening 42 adapted to receive a pin-like projection 43 formed inwardly of the recess 34a in the trim when the clip 35a is positioned in said recess. After the clamp has been properly seated in the recess, the projection 43 is headed over, as illustrated at 44, to attach the clamp 35a inwardly of said recess.

Figure 10:
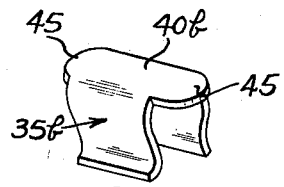
Fig. 10 is a view generally similar to Figs. 6 and 8 of a further modified clamp.
Figure 11:
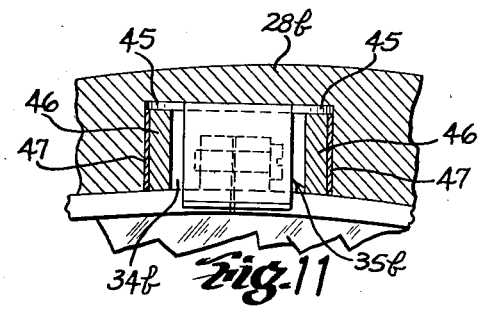
Fig. 11 is a view generally similar to Figs. 7 and 9 showing the clamp of Fig. 10 in assembled relation with the trim.

In Figures 10 and 11, there is illustrated a further modification of clamp 35b which is generally similar to clamp 35a with the exception that the intermediate portion 40b is provided with outwardly extending ends 45 which are adapted to seat inwardly of the base of the recess 34b formed internally of the trim 28b. In this instance, the trim is formed of plastic or other suitable non-metallic material and after the clamp 35b has been inserted in the recess 34b, retaining members 46 formed of plastic or other non-metallic material are cemented or otherwise secured to the end walls of the recess 34b by the use of a suitable solvent or adhesive 47 with the upper ends of the retaining members engaging with the outwardly extending portions 45 to thereby lock the clip 35b inwardly of said recess 34b and in attached relation with the trim 28b.

Figure 12:
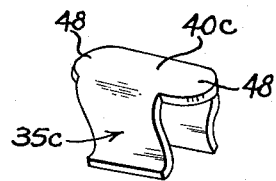
Fig. 12 is a view generally similar to Fig. 10 of a further modification of clamp.
Figure 13:
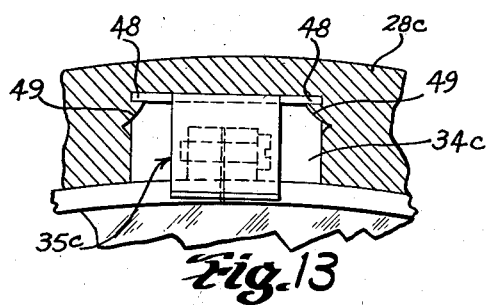
Fig. 13 is a view generally similar to Fig. 11 showing the clamp of Fig. 12 in assembled relation with the trim.

In Figures 12 and 13, there is illustrated a further modification of clamp 35c which is generally similar in construction and function to the clamp 35 and which has its intermediate portion 40c provided with outwardly extending portions 48 which are adapted to fit internally of the recess 34c of a metallic trim 28c. After the clamp 35c has been seated in the recess 34c, portions of the metallic material of the end walls of the recess 34c are struck outwardly, as illustrated at 49 to overlie said ends 48 and thereby secure the clamp 35c to the trim inwardly of said recess 34c.

Figure 14:
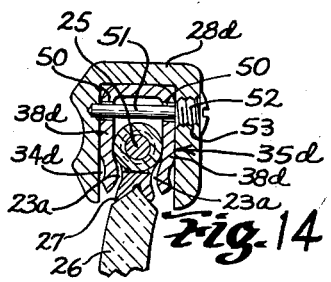
Fig. 14 is a view generally similar to Fig. 4 illustrating a further modification of attachment of the clamp to the trim.

In Figure 14, there is illustrated a further modification of means for attaching the clamp 35d to a trim 28d formed either of metal or non-metallic material. In this instance, the clamp 35d is generally similar to the clamp 35 of Fig. 6 with the exception that the spaced branches 38d are provided with openings 50 for receiving a pin-like projection 51 having a threaded head 52 which is adapted to be threadedly connected within a threaded opening 53 formed in a side wall of the trim 28d. The pin-like projection thereby locks the clamp 35d internally of the recess 34d of the trim so as to retain said clamp in assembled relation with said trim.

All of the above-described clamps function in a similar manner in that they are adapted to be snapped into superimposed connected relation with the connecting lugs 23 and 24 of the divided ends of the rims.

It is to be understood that although one configuration of trim is shown, many trims of different configurations may be provided in the above-described manner.

The lens supporting rims of the mounting are, in a conventional manner, provided on the nasal sides thereof with suitable adjustably supported nose-engaging pads 55.

From the foregoing description, it will be seen that simple, efficient, and economical means and method have been provided for accomplishing all of the objects and advantages of the invention and that the detachable trims embodying the invention may be quickly and easily assembled with or dis-assembled from the lens supporting frame of the mounting and will be retained in proper fitted and connected relation with said mounting during the use thereof.

Having described my invention, I claim:

1. A supporting structure for the lenses of an ophthalmic mounting comprising a pair of lens rims each having a divided section in the upper portion thereof, tubular lugs attached to the rims adjacent the ends of said divided sections, said lugs and rims, adjacent the line of attachment, having channels along the opposite sides thereof, means for connecting said lugs for retaining lenses in said rim members when positioned therein, a bridge having end portions connected to said rims adjacent the nasal sides thereof and having attachment means adjacent said end portions, relatively long outwardly and rearwardly extending temple endpieces each having an edge portion adjacent their inner ends secured to the upper outer surface of said rims adjacent the respective temporal sides thereof, said endpieces being initially formed of relatively flat material and being shaped to extend upwardly relative to said rims, and detachable members adapted to be secured in partially encircling relation with each of the rims, said detachable members each having a slot with a portion thereof shaped to receive a respective inner portion of said upwardly extending endpieces and each having an outer rearwardly directed end portion extending through the rear surface of said members and through which the outer end portions of the endpieces extend, said members adjacent their nasal ends each having attachment means adapted to be connected with a respective attachment means of the bridge, said members each further having a recess in the underside thereof intermediate the slot and the nasal end thereof, and a U-shaped clamp secured in each of said recesses adapted to be positioned in straddling clamped relation with the lugs and having portions adjacent the free ends thereof extending into the channels and being adapted to function cooperatively with said attachment means and the portions of the endpieces extending in said slots for detachably retaining said members in aligned connected relation with the supporting structure.

2. A supporting structure for the lenses of an ophthalmic mounting comprising a pair of lens rims each having a divided section in the upper portion thereof, tubular lugs attached to the rims adjacent the ends of said divided sections, said lugs and rims, adjacent the line of attachment, having channels along the opposite sides thereof, means for connecting said lugs for retaining lenses in said rim members when positioned therein, a bridge having end portions connected to said rims adjacent the nasal sides thereof and having undercut attachment means adjacent said end portions, relatively long outwardly and rearwardly extending temple endpieces each having an edge portion adjacent their inner ends secured to the upper outer surface of said rims adjacent the respective temporal sides thereof, said endpieces being initially formed of relatively flat material and being shaped to extend upwardly relative to said rims, and detachable members adapted to be secured in partially encircling relation with each of the rims, said detachable members each having a slot in the underside thereof with a portion of said slot shaped to receive a respective inner portion of said upwardly extending endpieces and each having an outer rearwardly curved end portion extending through the rear surface of said members and through which the outer end portions of the endpieces extend, said members adjacent their nasal ends each having a lip adapted to extend within a respective undercut attachment means of the bridge, said members each further having a recess in the underside thereof intermediate the slot and the nasal end thereof and a U-shaped clamp secured in each of said recesses adapted to be positioned in straddling clamped relation with the lugs and having portions adjacent the free ends thereof extending into the channels and being adapted to function cooperatively with said attachment means and the portions of the endpieces extending in said slots for detachably retaining said members in aligned connected relation with the supporting structure.

3. An ophthalmic mounting comprising a pair of lenses, a pair of lens rims each having a divided section in the upper portion thereof, tubular lugs attached to the rims adjacent the ends of said divided sections, said lugs and rims, adjacent the line of attachment, having channels along the opposite sides thereof, means for connecting said lugs for retaining lenses in said rim members, a bridge having end portions connected to said rims adjacent the nasal sides thereof and having attachment means adjacent said end portions, relatively long outwardly and rearwardly curving temple endpieces each having a portion adjacent their inner ends secured to the upper outer surface of said rims adjacent the respective temporal sides thereof, said endpieces being initially formed of relatively flat material and being shaped to extend upwardly relative to said rims, and detachable members adapted to be secured in partially encircling relation with each of the rims, said detachable members each having a slot in the underside thereof with a portion of said slot shaped to receive the respective inner portion of said upwardly extending endpieces and each having an outer rearwardly curved end portion extending through the rear surface of said members and through which the outwardly and rearwardly curved portions of the endpieces extend, said members adjacent their nasal ends each having attachment means adapted to be connected with the attachment means of the bridge, said members each further having a recess in the underside thereof intermediate the slot and the nasal end thereof and having a rim receiving groove in the underside thereof communicating with the recess and said slot and a clamp secured in each of said recesses adapted to be positioned in straddling clamped relation with the lugs and having portions adjacent the free ends thereof extending into the channels and being adapted to function cooperatively with said attachment means of the bridge, the portions of the endpieces extending in said slots and rim sections fitting in said grooves for detachably retaining said members in aligned connected relation with said mounting.

4. A detachable trim for use with a lens supporting structure of an ophthalmic mounting of the type embodying a pair of lens rims each having a divided section in the upper portion thereof, tubular lugs attached to the rims adjacent the ends of said divided sections, said lugs adjacent their line of attachment to the rims, having channels along the opposite sides thereof, means for connecting said lugs for retaining lenses in said rim members when positioned therein, a bridge having end portions connected to said rims adjacent the nasal sides thereof and having attachment means adjacent said end portions, relatively long outwardly and rearwardly curving temple endpieces each having an edge portion adjacent their inner ends secured to the upper outer surface of said rims adjacent the respective temporal sides thereof, said endpieces being initially formed of relatively flat material and being shaped to extend upwardly relative to said rims, said trim comprising a main body portion shaped to be secured in partially encircling relation with the upper portion of a lens rim and having a slot in the underside thereof with a portion of said slot shaped to receive the respective inner portion of an upwardly extending endpiece and having an outer rearwardly curved end portion extending through the rear surface of said trim and through which the outer curved portion of the endpiece extends, said trim adjacent its nasal end having attachment means adapted to be connected with the attachment means of the bridge, said trim further having a recess in the underside thereof intermediate the slot and the nasal end thereof and having a U-shaped clamp secured in said recess adapted to be positioned in straddling clamped relation with the lugs, said clamp having portions adjacent the free ends thereof extending into the channels and being adapted to function cooperatively with said attachment means of the bridge and the portions of the endpieces extending in said slots for detachably retaining said trim in aligned connected relation with the supporting structure.

References Cited in the file of this patent

UNITED STATES PATENTS

| 2,367,389 | Ditto | Jan. 16, 1945 |
| 2,703,036 | Splaine | Mar. 1, 1955 |
| 2,748,655 | Rohrbach | June 5, 1956 |
| 2,887,008 | Gross | May 19, 1959 |

FOREIGN PATENTS

| 1,084,994 | France | July 21, 1954 |